Jan. 12, 1965     J. A. HAMILTON     3,165,040
CLOSURE DEVICE FOR A CAMERA
Filed March 29, 1963
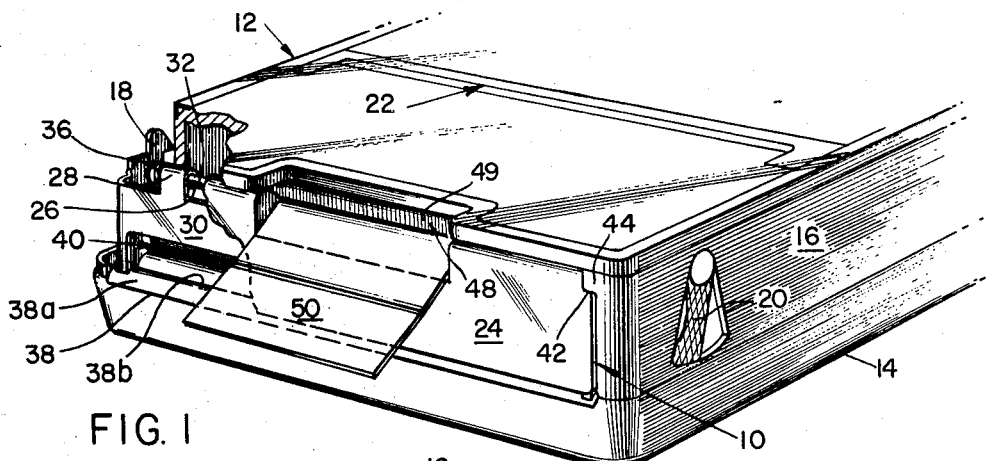
FIG. 1
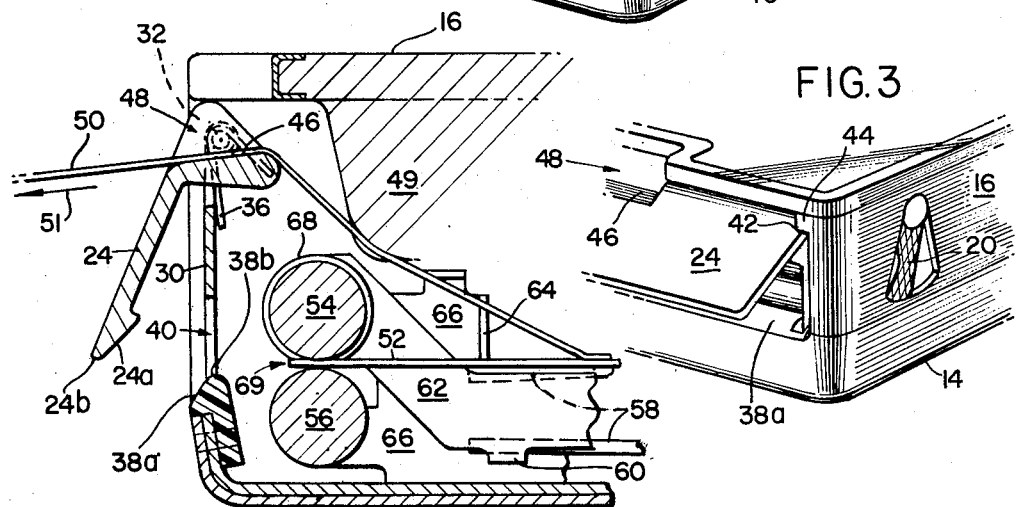
FIG. 2
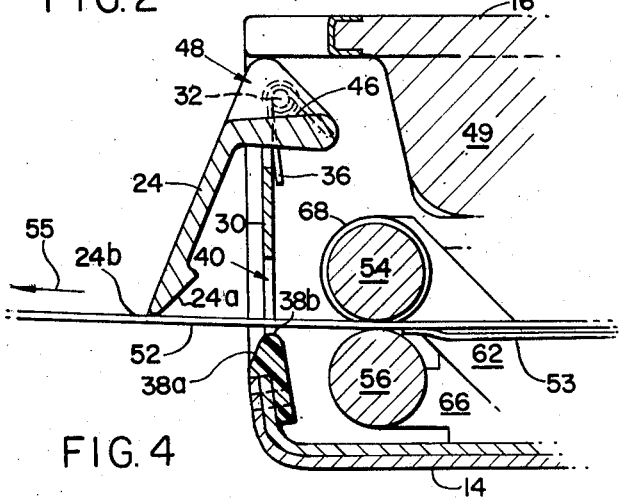
FIG. 3
FIG. 4
INVENTOR.
Joel A. Hamilton
BY Brown and Mikulka
ATTORNEYS United States Patent Office 3,165,040
Patented Jan. 12, 1965

3,165,040
CLOSURE DEVICE FOR A CAMERA
Joel A. Hamilton, West Medway, Mass., assignor to Polaroid Corporation, Cambridge, Mass., a corporation of Delaware
Filed Mar. 29, 1963, Ser. No. 268,999
8 Claims. (Cl. 95—13)

This invention relates to photographic apparatus and, more especially, to a pivotal closure device for an elongated, narrow exit aperture of a camera, through which a leader and attached image-forming portions of a film assembly are withdrawable.

The closure device of the present invention serves, at its closed, covering position, as a barrier to the entrance of actinic light and harmful foreign matter into processing and exposure areas of the camera through the exit aperture. At its open, uncovering position, the device provides both an unobstructed aperture for withdrawal from the camera of the aforementioned film assembly and serves as a guide for contacting one face of the film assembly and limiting the angle of its withdrawal in a given direction. A fixed cooperating member of the closure device limits the angle of withdrawal of the film assembly in another direction.

The present closure device is particularly adapted to use with a so-called self-developing camera and with processing apparatus thereof of the type described in the copending U.S. patent application of Rogers B. Downey, Serial No. 203,265, filed June 18, 1962, and the copending U.S. patent application Serial No. 268,882, filed concurrently herewith in the name of Rogers B. Downey, and film assemblies of the general type shown in U.S. Patents 3,079,849 and 3,080,805. In the aforesaid patent applications there is described aparatus for processing individual film assemblies or units of a film pack in which each film assembly, comprising a photosensitive sheet, a second sheet and a releasably-contained processing liquid is exposed and advanced between a pair of pressure rolls to release the liquid and spread it evenly between the sheets, so as to form an image on one of the sheets by a diffusion transfer process. The film assembly is first advanced by manually drawing upon a tab extending through a first exit slot until a leader to which the tab is releasably connected, is advanced between the pressure rolls and protrudes slightly through a second exit slot of the camera. The tab separates from the leader and, thereafter, the leader is manually drawn upon to advance the film assembly between the pressure rolls for the above-described purpose, between a pair of margin-compressing elements for holding the released liquid confined to the film assembly, and through the second exit slot to a location outside of the camera.

In the performance of these operations it is highly important that compressive forces be carefully controlled in such respects as evenness and direction of application. One factor leading to attainment thereof is the reduction or elimination of friction within the compression-applying mechanism and between the moving film assembly and fixed parts of the processing apparatus. Another is the proper guidance of the film assembly so that pressures are not erroneously applied, as, for example, so that they are not applied predominantly to one face of the film assembly to the substantial exclusion of the other.

With the foregoing considerations in mind, objects of the invention are to provide a substantially light- and dust-obstructing closure device for an exit aperture of a camera, the latter being of a type adapted to expose and process a plurality of film assemblies of a film pack; to provide a closure device of the character described wherein the closure structure provides that a closure member of the device is opened in response to contact therewith and tensioning of the aforementioned draw tab; to provide associated limit stop means for limiting the maximum angle of opening of the closure member; to provide a closure device, as described, wherein a closure member is spring biased to a closed position; to provide a closure member having an acutely angled face adapted to divert incident light angularly and provide an effective light barrier; and to provide an associated elongated fixed member cooperatnig with the closure member, the fixed member having an acutely angled face mating with the angled face of the closure member at closed position of the latter.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein:

FIGURE 1 is a fragmentary perspective view of a camera housing or casing incorporating the closure device of the invention, a closure member thereof being shown at closed position and, in part, broken away;

FIG. 2 is a fragmentary side elevation view of the closure device, partly in cross-section with the closure member brought to open position by manually drawing upon the draw tab of the film assembly;

FIG. 3 is a fragmentary perspective view similar to FIGURE 1 but showing the closure member at open position; and FIG. 4 is a fragmentary side elevation view, similar to that of FIG. 2 but wherein the closure member has been brought to open position by drawing upon the leader of the film assembly.

Referring now to FIGURE 1, there is illustrated the closure device 10 of the present invention mounted at one end of a camera housing 12 and, more particularly, on a pivotal section 14 of a camera back which is releasably fastened to a fixed portion 16 of the camera back by latching means shown in part at 18 and having an actuating lever 20. The camera may, suitably, be of a folding type having a bellows generally indicated at 22. The closure device 10 comprises a principal rectangular closure member 24, pivotally attached along its front edge at bearings 26 to the rolled-over flanges 28 of an underlying and forwardly-extending flange or end plate 30 by a pair of pivot pins 32 rotatably mounted in bearings 26 and fixedly attached to the block or lug portions 34 integral with closure member 24 so that the pins rotate with any pivotal movement of the closure member 24, in response to or against the bias of a pair of torsion springs 36. The closure member 24 is biased to a closed position by the torsion springs 36, the latter having one end attached to the pins 32 and the other bearing against the plate 30. The rear extremity of the closure member 24, at closed position, is in contact with an elongated bar element 38 attached to the camera back. Both the closure member 24 and bar element 38 are appropriately composed of a plastic material such as the plastic having the trade name "Implex," manufactured by Rohm & Haas Co., Philadelphia, Pennsylvania, U.S.A. Plate 30 is an integral part as, for example, a forwardly-turned member of the frame structure of pivotal section 14 of the camera back. The terms "front," "forwardly," etc., are used herein to indicate proximity to the front of the camera, and the terms "back," and "rearwardly," etc., are employed in an opposite sense.

The plate 30, underlying the closure member 24, has an elongated aperture 40 formed therein which is uncovered and through which the film assembly may be withdrawn when the closure member 24 is at open position. The maximum open position of the latter is determined by contact of the cut-away edges 42 with the small areas or tabs 44 projecting from the housing, the latter serving as limit stop means for the purpose. The rear extremity of closure member 24 includes an angularly shaped portion 24a which, at closed position of member 24 is in contact with the angularly contoured face 38a of bar member 38 to provide an actutely angled interface. This structure contributes to an effective seating of the closure member 24 and prevents the entrance of actinic light to photosensitive components of the film pack.

The closure member 24 includes a centrally-located, recessed and angularly-faced channel 46 which, at its inner extremity, provides, in conjunction with an adjacent area of the camera casing, a narrow slot 48 extending inwardly and then rearwardly, the latter direction being due, in part, to the presence of a guide member 49 within the camera forming a passage therein. The slot 48 serves as an exit aperture leading from the interior of the camera and unwanted light is prevented from entering therethrough because of the angular disposition of the aforesaid passage. As will be apparent, the closure member 24 at no time covers the aperture 48. A draw tab 50, releasably attached, as by a pressure sensitive adhesive, to a leader 52 of each film assembly of the film pack, projects through the slot 48 and is in slidable contact with the angularly faced channel 46, in readiness to be grasped, as shown in FIGURE 1. When manually drawn upon in the direction of the arrow 51, after the photographic exposure of a foremost film assembly of the film pack, the draw tab serves several functions. It advances an exposed photosensitive sheet of the film assembly from the focal plane of the camera to a super-imposed relation with a second or image-receiving sheet of the film assembly. When the tab is drawn upon it becomes tautened and bears forcefully on the channel surface 46 of the closure member or, more particularly, on that portion thereof which is most markedly offset with respect to the axis of the pivotal means 32. The fact that the tab is first advanced along the aforesaid rearwardly disposed passage provides a sharp change in its direction around the channeled portion 46, thus contributing to its exerting leverage on the bearing surface thereof. The closure member 24 is thereby caused to pivot momentarily to an open position the limit of which is determined by the limit stop means 42 and 44. This operation is clearly illustrated in FIG. 2. Continued drawing upon the draw tab 50 advances leader 52 of the film assembly 53 after the aforesaid sheets of the film assembly have been superimposed, to a position between a pair of pressure rolls 54 and 56 and through the aperture 30 and that provided by the open closure member 24.

The pressure rolls 54 and 56 are urged in a direction toward one another by a U-shaped spring 58, the extremities of which are divergingly biased. One spring extremity bears on a flange 60 extending from an arm 62 rotatably mounting the front pressure roll 54. The other spring extremity bears on a flange 64 extending from an arm 66, rotatably mounting the rear pressure roll 56. The arm 62 carrying pressure roll 54, is pivotally mounted for independent rotation with respect to the arm 66, thus permitting movement of pressure roll 54 toward and away from pressure roll 56, with and against the bias applied by U-spring 58, respectively, in response to various thicknesses of film materials passing between the rolls.

The pressure rolls are spaced slightly apart, when at their closest relationship, as provided by a pair of flanges 68 formed around the periphery of the pressure roll 54 at its extremities. The spacing or slot 69 thus provided between the rolls, is adapted to accept the leader 52 which is advanced therebetween by drawing upon the tab 50, as above described and shown in FIG. 2. Thence, as above stated, the leader is adapted to be further advanced through the aperture 40 of plate 30 to a location exteriorly of the camera. At this location it can be grasped and drawn upon for processing the film assembly by advancing the latter between the pressure rolls and out of the camera. Assuming the leader 52 to have just been brought to the aforesaid position, that is, projecting from the camera, the tab 50, which, as previously stated, is releasably attached to the leader, now separates from the latter due to the tab's being drawn laterally away from the leader, the guide member 49 determining the point of separation. This permits the closure member 24, which is no longer under the pivotal influence of the draw tab 50, to close rapidly, as actuated by the torsion spring 36, leaving the projecting leader 52 ready for use, as above described.

When the leader 52 is drawn upon, in the direction of the arrow 55, the film assembly 53 is advanced and progressively compressed between the pressure rolls 54 and 56, and the closure member 24 is again opened due to pressure of the leader against the surface 24b. Thus, a clear passage is provided for complete withdrawal of the film assembly from the camera. The slot 69, provided between the pressure rolls for accepting the leader 52, has no function with respect to the compressive action of the pressure rolls because, during compression of the film assembly, the rolls are caused to be spaced apart to an extent considerably greater than the height of the flanges 68.

Processing of the film assembly to provide an image by a diffusion transfer method requires carefully calculated applications of compression thereto. This is particularly the case where the image is to be rendered in full color because improper compression of the film assembly may result in serious errors of color rendition. The permissible maximum angles at which the film assembly can be withdrawn, that is, the angles with respect to a plane normal to a second plane which includes the axes of both pressure rolls thus have a special significance with respect to image formation. Without the presence of guide or control means at the exit side of the pressure rolls 54 and 56 it will be observed that the film assembly could be caused to bear predominantly against the periphery of either roll 54 or roll 56, depending upon whether the operator drew the leader angularly forwardly or rearwardly to too great a degree. This would cause a considerable bend in the delicate layers of the film assembly thus providing possible artificial dimensional and structural changes therein, and would operate against a constant thickness of the spread processing liquid. In a manner not completely understood, these factors could affect the quality and color integrity of image formation undesirably, as above stated, producing mottled and other undesirable effects. To prevent withdrawing the film assembly from the pressure rolls at improper angles with respect to a horizontal plane of film assembly travel therebetween, the surfaces 24b and 38b constitute guide means to limit the angles of withdrawal. The maximum angles thus permitted by the closure member 24 and the bar member 38 may, appropriately, be approximately 5° where, for example, full-color film assemblies of a type presently contemplated are involved, but it is desired not to be limited thereto by reason of the fact that modifications of film structures may occur and the angular limitations relative to withdrawal of the film assembly may, accordingly, be altered. As previously described, the limit stop means 42 and 44 control the maximum opening of closure member 24 and thereby control one of the aforesaid withdrawal angles. The fixed position of the bar member 38, of course, determines the second angle.

The closure device 10 thus serves several purposes. In addition to its generally conventional function of preventing the entrance of actinic light to photosensitive film materials it serves as a pivotally responsive guide for the tab 50 and as a guide for the film assembly leader 52 and the film assembly itself during the somewhat critical withdrawal of the latter.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. A closure device for alternatively covering and uncovering an exit aperture of a camera of a type adapted to photographically expose and process a film assembly, said closure device comprising a closure member, pivotal means rotatably attaching said member to a frame portion of said camera at a location adjacent to said exit aperture so as to substantially completely cover said exit aperture when at a closed position, spring means biasing said closure member toward said closed position, said closure member including an integral recessed portion having a bearing surface which is disposed angularly with respect to the major surface of said closure member and which is offset relative to an axis of said pivotal means, said recessed portion being adapted to slidably bear and to guide an elongated draw tab of said film assembly while said tab is being manually drawn upon for the purpose of advancing components of said film assembly for processing purposes, said closure member, by reason of its offset bearing surface, being caused to undergo pivotal movement in response to the tautening of said tab during its advancement and thereby to pivot said closure member to an open position uncovering said exit aperture and permitting a leader of said film assembly to pass through said aperture.

2. A closure device, as defined in claim 1, wherein said recessed portion of said closure member is located adjacent to an open aperture of said camera at the end of an internal passage thereof, through which said draw tab extends.

3. A closure device, as defined in claim 2, wherein said bearing surface of said recessed portion is disposed angularly with respect to said passage, thereby facilitating pivotal movement of said closure member when said draw tab is manually drawn upon and tautened.

4. A closure device as defined in claim 1, wherein the rearwardly located extremity of said closure member constitutes a guide for controlling the angle of withdrawal of said film assembly from said camera, as performed by manually drawing upon said leader.

5. A closure device, as defined in claim 4, wherein is included limit stop means for determining the maximum opening of said closure member.

6. A closure device, as defined in claim 1, wherein the rearwardly located extremity of said closure member is shaped at an acute angle with respect to the principal surface of said closure member and is adapted to mate with an angular edge of said exit aperture when at closed position.

7. A closure device for alternatively closing and opening an exit aperture of a camera in which a plurality of film assemblies of a film pack, is individually photographically exposed and, thereafter, advanced between compressive means for processing purposes and through said exit aperture to a location exteriorly of the camera, each film assembly including a draw tab, a photosensitive sheet, at least a second sheet, a releasably-contained processing liquid and a leader, said closure device comprising a generally planar, elongated closure member, means pivotally attaching said closure member to a frame element of said camera at a location adjacent to said exit aperture so as to completely cover said exit aperture when at closed position, a torsion spring biasing said closure member toward said closed position, said closure member including an integral recessed portion having a generally planar bearing surface which is disposed angularly with respect to the plane of said closure member and which is offset relative to an axis of said pivotal means, said recessed portion being adapted to slidably bear and guide an elongated draw tab releasably attached to said film assembly while said tab is being drawn upon, manually, for the purpose of advancing components of said film assembly with respect to compressive processing means of said camera, said closure member, as enabled by said offset bearing surface, being caused to undergo pivotal movement to an open position in response to the tautening of said tab during advancement of the latter, thereby providing an open condition of said exit aperture for passage therethrough of said leader and attached components of said film assembly.

8. A closure device for alternatively covering and uncovering an elongated exit aperture of a camera of a type adapted to photographically expose and process a plurality of film assemblies of a film pack, the processing of each film assembly being accomplished by drawing upon a leader thereof to advance said film assembly between compressive means of said camera and, thence, through said exit aperture, said closure device comprising a generally planar, plate-like closure member having an angularly shaped rear extremity, means pivotally mounting said closure member on a frame portion of said camera having said exit aperture formed therein so that said closure member covers said exit aperture when at closed position, limit stop means determining the maximum open position of said closure member, an elongated bar member having an angularly shaped face overlying the rearwardly located edge of said exit aperture, said face mating with the angularly shaped rear extremity of said closure member when the latter is at closed position, spring means biasing said closure member to closed position, means providing a channel having a recessed bearing surface formed on the exterior of said closure member, at least a portion of which is offset with respect to the axis of said means pivotally mounting said closure member, said bearing surface being adapted to slidably accommodate and bear the slidable advancement of a draw tab connected with said film assembly, said offset portion thereof being adapted to provide pivotal movement of said closure member when said draw tab is manually drawn upon and tautened for performing its advancement.

No references cited.